US010237601B2

(12) United States Patent
Fay

(10) Patent No.: US 10,237,601 B2
(45) Date of Patent: Mar. 19, 2019

(54) DISTRIBUTION SYSTEM, RECEPTION APPARATUS, AND METHODS FOR TRANSITIONING TO NEW SERVICES

(71) Applicant: Saturn Licensing LLC, New York, NY (US)

(72) Inventor: Luke Fay, San Diego, CA (US)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/826,735

(22) Filed: Aug. 14, 2015

(65) Prior Publication Data

US 2015/0358660 A1 Dec. 10, 2015

Related U.S. Application Data

(63) Continuation of application No. 13/930,814, filed on Jun. 28, 2013, now Pat. No. 9,137,566.

(51) Int. Cl.
*H04N 21/2665* (2011.01)
*H04N 21/236* (2011.01)
(Continued)

(52) U.S. Cl.
CPC ........ *H04N 21/2665* (2013.01); *H04H 20/33* (2013.01); *H04H 20/423* (2013.01);
(Continued)

(58) Field of Classification Search
CPC ............. H04N 21/233; H04N 21/2335; H04N 21/234; H04N 21/23406; H04N 21/2343;
(Continued)

(56) References Cited

U.S. PATENT DOCUMENTS 5,854,835 A 12/1998 Montgomery et al.
6,104,436 A * 8/2000 Lee .................. H04N 5/44513 348/563

(Continued)

FOREIGN PATENT DOCUMENTS

| | | |
|---|---|---|
| CN | 1509081 A | 6/2004 |
| CN | 1941670 A | 4/2007 |

OTHER PUBLICATIONS

U.S. Appl. No. 13/216,375, filed Aug. 24, 2011, Hattori, et al.

(Continued)

*Primary Examiner* — Nnenna N Ekpo
(74) *Attorney, Agent, or Firm* — Oblon, McClelland, Maier & Neustadt, L.L.P.

(57) ABSTRACT

A distribution system and reception apparatus, and methods thereof, are provided for broadcasting and receiving a plurality of non-backwards-compatible services. The broadcasting method includes receiving, by a first service provider, a plurality of first services, which include a first service from each of the first and second service providers. The first service provider generates a first broadcast multiplex, including the plurality of first services, and broadcasts the first broadcast multiplex on a first broadcast channel allocated to the first service provider. A second service provider receives a plurality of second services, which include a second service from each of the first and second service providers. The second service provider generates a second broadcast multiplex, including the plurality of second services, and broadcasts the second broadcast multiplex on a second broadcast channel allocated to the second service provider.

18 Claims, 10 Drawing Sheets

Re-Pack 325b 335b 330 freq

(51) Int. Cl.

*H04N 21/2385* (2011.01)
*H04N 21/241* (2011.01)
*H04N 21/438* (2011.01)
*H04N 21/443* (2011.01)
*H04N 21/462* (2011.01)
*H04H 60/00* (2009.01)
*H04H 20/33* (2008.01)
*H04H 20/42* (2008.01)

(52) U.S. Cl.

CPC .......... *H04H 60/00* (2013.01); *H04N 21/236* (2013.01); *H04N 21/2385* (2013.01); *H04N 21/241* (2013.01); *H04N 21/4383* (2013.01); *H04N 21/443* (2013.01); *H04N 21/4622* (2013.01)

(58) Field of Classification Search

CPC ... H04N 21/234309; H04N 21/234318; H04N 21/234327; H04N 21/234336; H04N 21/234345; H04N 21/234354; H04N 21/234363; H04N 21/234372; H04N 21/234381; H04N 21/23439; H04N 21/235; H04N 21/2355; H04N 21/2356; H04N 21/2358; H04N 21/238; H04N 21/23805; H04N 21/2387; H04N 21/262

USPC .................................... 725/67, 68, 114, 116

See application file for complete search history.

(56) References Cited

U.S. PATENT DOCUMENTS 7,940,337 B2 5/2011 Goyal et al.
8,200,243 B1 6/2012 Feher
8,595,783 B2 11/2013 Dewa
8,705,933 B2 4/2014 Eyer
8,839,338 B2 9/2014 Eyer
8,842,974 B2 9/2014 Kitazato
8,863,171 B2 10/2014 Blanchard et al.
8,872,888 B2 10/2014 Kitazato
8,875,169 B2 10/2014 Yamagishi
8,875,204 B2 10/2014 Kitazato
8,884,800 B1 11/2014 Fay
8,886,009 B2 11/2014 Eyer
8,892,636 B2 11/2014 Yamagishi
8,893,210 B2 11/2014 Eyer
8,896,755 B2 11/2014 Kitazato et al.
8,898,720 B2 11/2014 Eyer
8,898,723 B2 11/2014 Eyer
8,904,417 B2 12/2014 Kitahara et al.
8,908,103 B2 12/2014 Kitazato
8,909,694 B2 12/2014 Yamagishi et al.
8,914,832 B2 12/2014 Yamagishi
8,917,358 B2 12/2014 Eyer
8,918,801 B2 12/2014 Kitazato et al.
8,925,016 B2 12/2014 Eyer
8,930,988 B2 1/2015 Kitazato et al.
8,938,756 B2 1/2015 Kitazato
8,941,779 B2 1/2015 Eyer
8,966,564 B2 2/2015 Kitazato
8,988,612 B2 3/2015 Kitazato
8,989,723 B2 3/2015 Coppinger et al.
9,015,785 B2 4/2015 Yamagishi
9,038,095 B2 5/2015 Fay et al.
9,043,857 B2 5/2015 Dewa
9,078,031 B2 7/2015 Kitazato et al.
2002/0007494 A1* 1/2002 Hodge ................ H04L 12/2801 725/109
2006/0061682 A1 3/2006 Bradley et al.
2006/0127032 A1 6/2006 Van Rooyen
2006/0197828 A1* 9/2006 Zeng .............. H04N 21/234327 348/14.13
2008/0178248 A1* 7/2008 Kim ..................... H04N 5/4401 725/134
2009/0028080 A1* 1/2009 Song .................... H04N 21/235 370/310
2009/0106806 A1* 4/2009 Lee .................... H04N 7/17318 725/110
2009/0280808 A1 11/2009 You et al.
2011/0088075 A1 4/2011 Eyer
2011/0216655 A1 9/2011 Chen et al.
2011/0228752 A1* 9/2011 Wu ....................... H04W 48/10 370/338
2011/0243536 A1 10/2011 Eyer
2011/0246488 A1 10/2011 Eyer
2011/0247028 A1 10/2011 Eyer
2011/0258665 A1* 10/2011 Fahrny ............... H04N 21/4334 725/47
2011/0268196 A1 11/2011 Suh et al.
2011/0298981 A1 12/2011 Eyer
2011/0299827 A1 12/2011 Eyer
2011/0302599 A1 12/2011 Eyer
2011/0302611 A1 12/2011 Eyer
2012/0050619 A1 3/2012 Kitazato et al.
2012/0054214 A1 3/2012 Yamagishi et al.
2012/0054235 A1 3/2012 Kitazato et al.
2012/0060197 A1 3/2012 Kitahara et al.
2012/0063508 A1 3/2012 Hattori et al.
2012/0072965 A1 3/2012 Dewa
2012/0081607 A1 4/2012 Kitazato
2012/0084802 A1 4/2012 Kitazato
2012/0117595 A1* 5/2012 Svendsen ................ H04N 5/76 725/39
2012/0185888 A1 7/2012 Eyer et al.
2012/0253826 A1 10/2012 Kitazato et al.
2012/0291071 A1* 11/2012 Seo ................. H04N 21/26283 725/41
2013/0014167 A1 1/2013 Sakashita et al.
2013/0024894 A1 1/2013 Eyer
2013/0036440 A1 2/2013 Eyer
2013/0055313 A1 2/2013 Eyer
2013/0103716 A1 4/2013 Yamagishi
2013/0191860 A1 7/2013 Kitazato et al.
2013/0201316 A1* 8/2013 Binder .................... H04L 67/12 348/77
2013/0201399 A1 8/2013 Kitazato et al.
2013/0205327 A1 8/2013 Eyer
2013/0212634 A1 8/2013 Kitazato
2013/0254824 A1 9/2013 Eyer
2013/0282870 A1 10/2013 Dewa et al.
2013/0283311 A1 10/2013 Eyer
2013/0283328 A1 10/2013 Kitazato
2013/0291022 A1 10/2013 Eyer
2013/0340007 A1 12/2013 Eyer
2014/0013347 A1 1/2014 Yamagishi
2014/0013379 A1 1/2014 Kitazato et al.
2014/0040965 A1 2/2014 Kitazato et al.
2014/0040968 A1 2/2014 Kitazato et al.
2014/0043540 A1 2/2014 Kitazato et al.
2014/0053174 A1 2/2014 Eyer et al.
2014/0067922 A1 3/2014 Yamagishi et al.
2014/0099078 A1 4/2014 Kitahara et al.
2014/0122528 A1 5/2014 Yamagishi
2014/0137153 A1 5/2014 Fay et al.
2014/0137165 A1 5/2014 Yamagishi
2014/0150040 A1 5/2014 Kitahara et al.
2014/0157304 A1 6/2014 Fay et al.
2014/0186008 A1 7/2014 Eyer
2014/0208375 A1 7/2014 Fay et al.
2014/0208380 A1 7/2014 Fay et al.
2014/0229580 A1 8/2014 Yamagishi
2014/0229979 A1 8/2014 Kitazato et al.
2014/0253683 A1 9/2014 Eyer et al.
2014/0327825 A1 11/2014 Eyer
2014/0348448 A1 11/2014 Eyer
2014/0351877 A1 11/2014 Eyer
2014/0354890 A1 12/2014 Eyer
2015/0007215 A1 1/2015 Fay et al.
2015/0007219 A1 1/2015 Blanchard et al.
2015/0007242 A1 1/2015 Fay
2015/0012588 A1 1/2015 Yamagishi
2015/0012955 A1 1/2015 Kitazato
2015/0020146 A1 1/2015 Eyer

(56) References Cited

U.S. PATENT DOCUMENTS

2015/0026730 A1 1/2015 Eyer
2015/0026739 A1 1/2015 Kitazato
2015/0033280 A1 1/2015 Fay
2015/0038100 A1 2/2015 Fay
2015/0046937 A1 2/2015 Kitazato et al.
2015/0046942 A1 2/2015 Eyer
2015/0058410 A1 2/2015 Yamagishi et al.
2015/0058875 A1 2/2015 Kitahara et al.
2015/0058906 A1 2/2015 Kitazato et al.
2015/0058911 A1 2/2015 Kitazato et al.
2015/0062428 A1 3/2015 Eyer
2015/0067713 A1 3/2015 Yamagishi
2015/0074704 A1 3/2015 Kitazato
2015/0082367 A1 3/2015 Kitazato
2015/0100997 A1 4/2015 Kitazato
2015/0163557 A1 6/2015 Kitazato
2015/0195605 A1 7/2015 Eyer
2015/0215673 A1 7/2015 Yamagishi
2015/0222941 A1 8/2015 Fay et al.
2015/0222963 A1 8/2015 Dewa

OTHER PUBLICATIONS

U.S. Appl. No. 13/107,604, filed May 13, 2011, Dewa.
U.S. Appl. No. 13/220,231, filed Aug. 29, 2011, Kitahara, et al.
U.S. Appl. No. 13/038,939, filed Mar. 2, 2011, Eyer.
U.S. Appl. No. 12/985,241, filed Jan. 5, 2011, Eyer.
U.S. Appl. No. 13/039,005, filed Mar. 2, 2011, Eyer.
U.S. Appl. No. 13/075,440, filed Mar. 30, 2011, Yamagishi, et al.
U.S. Appl. No. 13/046,579, filed Mar. 11, 2011, Eyer.
U.S. Appl. No. 13/206,627, filed Aug. 10, 2011, Kitazato.
U.S. Appl. No. 13/238,065, filed Sep. 21, 2011, Kitazato.
U.S. Appl. No. 12/942,835, filed Nov. 9, 2010, Eyer.
U.S. Appl. No. 13/009,720, filed Jan. 19, 2011, Eyer, et al.
U.S. Appl. No. 13/080,866, filed Apr. 6, 2011, Kitazato, et al.
U.S. Appl. No. 13/071,551, filed Mar. 25, 2011, Kitazato, et al.
U.S. Appl. No. 12/798,118, filed Mar. 30, 2010, Eyer.
U.S. Appl. No. 13/038,984, filed Mar. 2, 2011, Eyer.
U.S. Appl. No. 13/038,967, filed Mar. 2, 2011, Eyer.
U.S. Appl. No. 13/422,203, filed Mar. 16, 2012, Kitazato, et al.
U.S. Appl. No. 13/562,946, filed Jul. 31, 2012, Eyer.
U.S. Appl. No. 13/559,166, filed Jul. 26, 2012, Eyer.
U.S. Appl. No. 13/490,216, filed Jun. 6, 2012, Eyer.
U.S. Appl. No. 13/587,975, filed Aug. 17, 2012, Kitazato.
U.S. Appl. No. 13/648,753, filed Oct. 10, 2012, Yamagishi.
U.S. Appl. No. 13/741,863, filed Jan. 15, 2013, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
U.S. Appl. No. 13/841,343, filed Mar. 15, 2013, Eyer.
U.S. Appl. No. 13/846,282, filed Mar. 18, 2013, Dewa et al.
U.S. Appl. No. 13/846,247, filed Mar. 18, 2013, Kitazato et al.
U.S. Appl. No. 13/888,865, filed May 7, 2013, Kitahara et al.
U.S. Appl. No. 13/894,779, filed May 15, 2013, Yamagishi.
U.S. Appl. No. 13/905,721, filed May 30, 2013, Kitahara et al.
U.S. Appl. No. 13/915,664, filed Jun. 12, 2013, Eyer.
U.S. Appl. No. 13/930,814, filed Jun. 28, 2013, Fay.
U.S. Appl. No. 13/930,880, filed Jun. 28, 2013, Fay et al.
U.S. Appl. No. 13/924,907, filed Jun. 24, 2013, Eyer.
U.S. Appl. No. 13/997,844, filed Jun. 25, 2013, Kitazato.
U.S. Appl. No. 13/927,667, filed Jun. 26, 2013, Yamagishi.
U.S. Appl. No. 13/934,615, filed Jul. 3, 2013, Eyer.
U.S. Appl. No. 13/934,924, filed Jul. 3, 2013, Yamagishi.
U.S. Appl. No. 13/963,138, filed Aug. 9, 2013, Fay et al.
U.S. Appl. No. 13/963,111, filed Aug. 9, 2013, Fay et al.
U.S. Appl. No. 13/968,035, filed Aug. 15, 2013, Eyer et al.
U.S. Appl. No. 14/026,551, filed Sep. 13, 2013, Yamagishi.
U.S. Appl. No. 14/046,543, filed Oct. 4, 2013, Fay et al.
U.S. Appl. No. 14/046,566, filed Oct. 4, 2013, Fay et al.
U.S. Appl. No. 14/069,032, filed Oct. 31, 2013, Yamagishi et al.
U.S. Appl. No. 14/196,432, filed Mar. 4, 2014, Eyer.
U.S. Appl. No. 14/253,474, filed Apr. 15, 2014, Kitazato et al.
U.S. Appl. No. 14/275,231, filed May 12, 2014, Eyer.
U.S. Appl. No. 14/282,572, filed May 20, 2014, Eyer et al.
U.S. Appl. No. 14/295,695, filed Jun. 4, 2014, Eyer.
U.S. Appl. No. 14/457,290, filed Aug. 12, 2014, Eyer.
U.S. Appl. No. 14/458,310, filed Aug. 13, 2014, Eyer.
U.S. Appl. No. 14/490,263, filed Sep. 18, 2014, Blanchard et al.
U.S. Appl. No. 14/493,661, filed Sep. 23, 2014, Yamagishi.
U.S. Appl. No. 14/493,721, filed Sep. 23, 2014, Kitazato.
U.S. Appl. No. 14/504,455, filed Oct. 2, 2014, Fay.
U.S. Appl. No. 14/504,984, filed Oct. 2, 2014, Eyer.
U.S. Appl. No. 14/509,200, filed Oct. 8, 2014, Eyer.
U.S. Appl. No. 14/509,166, filed Oct. 8, 2014, Kitazato.
U.S. Appl. No. 14/512,761, filed Oct. 13, 2014, Fay.
U.S. Appl. No. 14/512,776, filed Oct. 13, 2014, Kitazato.
U.S. Appl. No. 14/521,034, filed Oct. 22, 2014, Eyer.
U.S. Appl. No. 14/529,440, filed Oct. 31, 2014, Kitazato et al.
U.S. Appl. No. 14/529,490, filed Oct. 31, 2014, Yamagishi et al.
U.S. Appl. No. 14/529,450, filed Oct. 31, 2014, Kitazato et al.
U.S. Appl. No. 14/529,421, filed Oct. 31, 2014, Kitazato et al.
U.S. Appl. No. 14/529,461, filed Oct. 31, 2014, Kitahara et al.
U.S. Appl. No. 14/538,311, filed Nov. 11, 2014, Eyer.
U.S. Appl. No. 14/538,083, filed Nov. 11, 2014, Yamagishi.
U.S. Appl. No. 14/543,231, filed Nov. 17, 2014, Kitazato.
U.S. Appl. No. 14/551,299, filed Nov. 24, 2014, Kitazato.
U.S. Appl. No. 14/566,574, filed Dec. 10, 2014, Fay.
U.S. Appl. No. 14/584,875, filed Dec. 29, 2014, Eyer.
U.S. Appl. No. 14/626,216, filed Feb. 19, 2015, Kitazato.
U.S. Appl. No. 14/659,245, filed Mar. 16, 2015, Yamagishi.
U.S. Appl. No. 14/680,752, filed Apr. 7, 2015, Eyer.
U.S. Appl. No. 14/686,277, filed Apr. 14, 2015, Fay et al.
U.S. Appl. No. 14/689,825, filed Apr. 17, 2015, Dewa.
U.S. Appl. No. 14/735,879, filed Jun. 10, 2015, Kitazato et al.
U.S. Appl. No. 14/741,168, filed Jun. 16, 2015, Eyer.
U.S. Appl. No. 14/746,541, filed Jun. 22, 2015, Lachlan et al.
U.S. Appl. No. 14/810,004, filed Jul. 27, 2015, Eyer et al.
U.S. Appl. No. 14/806,243, filed Jul. 22, 2015, Fay et al.
International Search Report and Written Opinion dated Dec. 11, 2014, in PCT/US14/39741.
International Search Report and Written Opinion with Search History dated Dec. 11, 2014, in PCT/US14/39741.
Mexican Office Action dated Oct. 19, 2016 in Patent Application No. MX/a/2015/015172 (without English Translation).
Office Action dated Dec. 1, 2017, in corresponding Chinese Patent Application No. 201480035549.2 (with English-language translation), references AA, and AO-AP cited therein.

* cited by examiner

Current
325a
335a
310
freq

Re-Pack
325b
335b
330
freq

Future
325c
335c
freq

DISTRIBUTION SYSTEM, RECEPTION APPARATUS, AND METHODS FOR TRANSITIONING TO NEW SERVICES

CROSS-REFERENCE TO RELATED APPLICATIONS

This application is a continuation of U.S. application Ser. No. 13/930,814, filed Jun. 28, 2013, the entire content of which is incorporated herein by reference in its entirety.

BACKGROUND OF THE INVENTION

Field of the Invention

Embodiments described herein relate generally to transitioning to new services.

Background

Modern televisions and set top boxes are capable of receiving broadcast television services. However, due to limitations in wireless spectrum availability, broadcast television service providers may not have sufficient spectrum to provide new services that are not backwards compatible while maintaining the availability of existing (or legacy) services.

SUMMARY OF THE INVENTION

Embodiments of the present disclosure relate to addressing the problem of transitioning to new services when wireless spectrum is limited.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
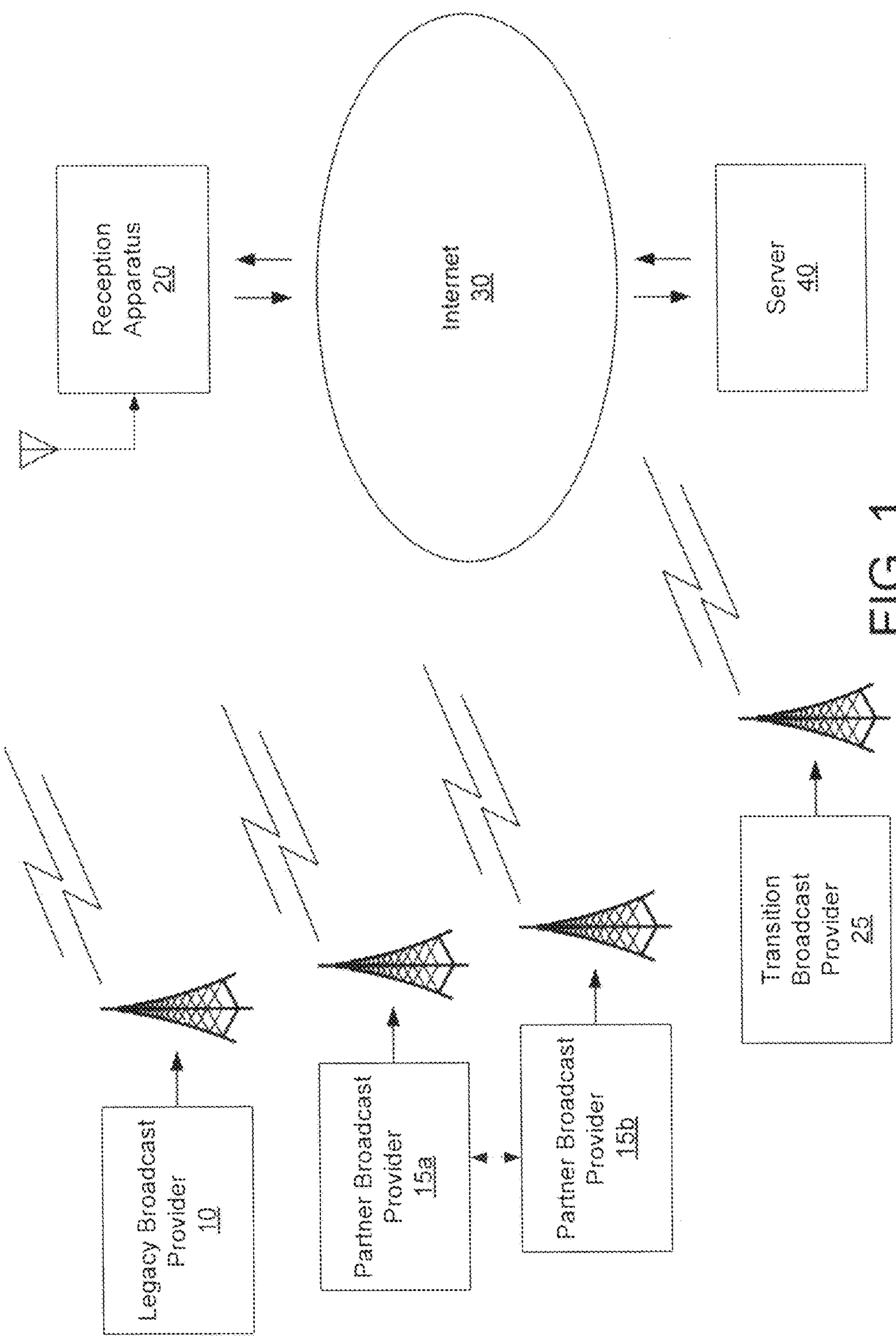
FIG. 1 illustrates an exemplary broadcast system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms “a” or “an”, as used herein, are defined as one or more than one. The term “plurality”, as used herein, is defined as two or more than two. The term “another”, as used herein, is defined as at least a second or more. The terms “including” and/or “having”, as used herein, are defined as comprising (i.e., open language). The term “coupled”, as used herein, is defined as connected, although not necessarily directly, and not necessarily mechanically. The term “program” or “computer program” or similar terms, as used herein, is defined as a sequence of instructions designed for execution on a computer system. A “program”, or “computer program”, may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term “program”, as used herein, may also be used in a second context (the above definition being for the first context). In the second context, the term is used in the sense of a “television program”. In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an EPG.

Reference throughout this document to “one embodiment”, “certain embodiments”, “an embodiment”, “an implementation”, “an example” or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term “or” as used herein is to be interpreted as an inclusive or meaning any one or any combination. Therefore, “A, B or C” means “any of the following: A; B; C; A and B; A and C; B and C; A, B and C”. An exception to this definition will occur only when a combination of elements, functions, steps or acts are in some way inherently mutually exclusive.

Embodiments of the disclosure are directed to transitioning from existing services to new services. Examples include transitions to next generation broadcast television (NGBT) services, next generation radio services, new Mobile Network Operator (MNO) services, etc.

Although the present disclosure is described using NGBT services as a primary example, it should be noted that the same principles also applies to other new services, such as those listed above. Moreover, while embodiments of the disclosure are directed to providing transitioning in wireless environments, similar principles can be applied to wired environments.

Certain embodiments of the disclosure are directed to transitioning to NGBT services that are not compatible with existing terrestrial broadcast services. In the case of a non-backwards-compatible system, the new NGBT services provide improvements in performance, functionality, and/or efficiency to facilitate its implementation. The new NGBT services provide new services such as mobile television, ultra-high-definition television (UHDTV) services, new audio and video codecs, more robust and/or efficient transmission methods, more operational modes, broadcaster control parameters, consumer control parameters, interactivity, etc.

For example, one NGBT service (i.e., the proposed Advanced Television Systems Committee (ATSC) 3.0) is planned to be a non-backwards compatible service to the existing 8-level vestigial sideband (8-VSB) modulation digital television broadcast service. The lack of backwards compatibility is due to the fact that other efficient technologies are now available that use wireless spectrum more efficiently, for example using orthogonal frequency-division multiplexing (OFDM)-low-density parity-check (LDPC) based technology. OFDM-LDPC based technology has already been adopted in other parts of the world and is likely to be adopted in a NGBT service.

With this new technology comes a new problem of how to transition from 8-VSB modulation to a non-backwards compatible modulation scheme (e.g., OFDM-based modulation). The present disclosure discusses an exemplary transition plan according to certain embodiments that offers one or a combination of avenues for broadcasters to take, depending on factors such as Federal Communications Commission (FCC) action (or non-action), broadcaster business deals, general motivation to use new services, etc.

Each avenue could be taken in its entirety as a solution, or any combination described herein could be utilized. As a result, the transition can be a balanced effort between broadcasters and the FCC. Markets could transition slow or fast depending on how effective each avenue of transition is applied. Further, the transition could be serially applied or in parallel where the FCC allocated extra spectrum and broadcaster deals are made. The order in which each avenue is applied can also be varied.

A transition plan is needed to get to the new NGBT service. An exemplary transition plan includes one or a combination of the following avenues: (1) have broadcasters double up their legacy service on one channel while supporting the NGBT service on another; (2) if difficulties arise, have the FCC allocate space in their re-pack of "voluntary auctions" for a transition area; and (3) if allocating space by the FCC is difficult, use a border channel (e.g., a broadcast channel that is adjacent to a MNO channel) such as channel 52 or 32 as a hard transition channel.

In one embodiment, the most desirable way to transition to the NGBT service is to not involve the FCC moving/reallocating frequency for the new transition. To accomplish this, broadcast channels are re-used with or without more efficient coding.

For example, existing services may be coded using MPEG-4, which is double the efficiency of MPEG-2, and is used in broadcasting in other parts of the world. Even ATSC Mobile DTV (ATSC standard A/153, which is incorporated herein by reference in its entirety) uses it. Moreover, the encoder is often in the same piece of equipment as the MPEG-2 encoder for broadcasters, so it is a simple cable re-locating exercise to put into practice (e.g., instead of connect to input A, connect to input B). As for receivers, MPEG-4 or Advanced Video Coding (AVC) decoders are in mass supply, or already integrated into televisions today to decode Mobile DTV, digital video broadcasting (DVB) based signals, Internet streaming signals, etc.

So, MPEG-4 encoding is currently available to broadcasters and MPEG-4 decoding is already available in receivers. To hook up a high-definition television (HDTV) service to MPEG-4 coding would not alienate many receivers and therefore could be used to combine 2 broadcasters' HDVT content into 1 broadcast channel.

Alternatively, to ensure compatibility with legacy devices, existing services are encoded using MPEG-2. However, MPEG-2 may not allow multiple high-definition services to be carried on a single broadcast channel. Accordingly, in certain embodiments, the existing services are transmitted in MPEG-2 with a lower bit rate (e.g., in the case of standard-definition television), as further described below.

The broadcasters would need to find a business solution and they both would want to transition to NGBT services. Further, the agreements could be strongly recommended by industry. But the fact that the FCC would have to do nothing is advantageous as a transition could therefore happen more quickly. One broadcast channel could be dedicated to legacy HDTV services and the other broadcast channel could use the new NGBT services.

If business agreements could not be made in a market, another option is that part of the transition could start to involve the FCC, for example at the time the FCC re-packs the wireless spectrum they obtain from the "voluntary auctions" slated to take place in the next few years. Trial periods where a transition channel is used for each set of broadcasters can be utilized.

The FCC is currently executing its National Broadband Plan to extend Internet services to the entire public. This involves giving spectrum to MNOs. The spectrum at issue includes the 700 MHz band channels previously occupied by television broadcasters. Currently the FCC is using "voluntary auctions" to gain even more spectrum for the MNOs, referred to as the 600 MHz band plan. Thoughts are that broadcast channels are desired for re-allocation. The auctions are expected to give a little bit of spectrum back and the FCC is expected to go through another round of channel re-packing. According to certain embodiments of the present disclosure, at least one block of spectrum is allocated by the FCC for NGBT transition services. The transition channel could be used on a broadcaster by broadcaster basis as a market transitions. In one embodiment, the transition channel is allocated with enough spectrum to support at least one service (e.g., fixed or mobile) for broadcasters to experiment with. Further, in one embodiment, the amount of transition spectrum is enough to support at least 4 major networks in a market (e.g., a 6 MHz channel).

As discussed above, in one embodiment, the transitions are not just for NGBT services (e.g., the proposed ATSC 3.0, a future ATSC 4.0), but any transition. For example, in order to make this option more appealing, the transition may be opened to other entities other than terrestrial television broadcasters such as radio broadcast providers and MNOs. This way a market can start to transition to a new service with one channel. This channel could be used by broadcasters in turn.

As noted above, in one embodiment it would be advantageous if enough spectrum is available to transition at least the top 4 networks at the same time. For example, for the proposed ATSC 3.0, the channel could only be 6 MHz for 4 networks depending on the type of service desired (e.g., mobile services).

Depending on how much spectrum is obtained from the "voluntary auctions," more frequency may be needed or more broadcasters may want to transition services. Thus, in one embodiment, border channels are allocated for transition services.

For example, Verizon wants to sell its lower 700 MHz A and B block licenses (e.g., channel 52) due to interference from broadcasters. Verizon has stated that the lower-band spectrum is not suitable for long-term evolution (LTE)

capacity requirements due to the fact that broadcasters on channel 51 adjacent to the A block spectrum splattering energy into their channel.

Accordingly, if Verizon is complaining of energy spillover from broadcasters, use it as a transition space. The FCC could re-purpose that channel as a transition channel. It is already on the edge of the 700 MHz band and since the MNOs are complaining of powerful broadcasters, the FCC can allocate that channel back to broadcasters, at a lower power in one embodiment, for the transition to NGBT services using a more efficient transmission scheme, for example for the upcoming bit demand in video. Further, as wireless spectrum is re-packed and/or reallocated by the FCC, other border channels may result that would be suitable for transition services (e.g., channel 32).

In certain embodiments, the transition broadcast channel is within a range of 470 MHz to 578 MHz based on possible reallocation of broadcast spectrum to wireless broadband services. As described above, in one embodiment, the transition broadcast channel is placed adjacent to a channel used for another purpose (e.g., wireless broadband), or between a television broadcast channel and the channel used for another purpose, to reduce interference effects by, for example, broadcasting the NGBT services at a power lower than existing broadcast services. For example, the transition broadcast channel may be a 6 MHz channel from 578 to 584 MHz (i.e., channel 32) or 698 to 704 MHz (i.e., channel 52).

In other embodiments, the transition broadcast channel is allocated within the very high frequency (VHF) band in a range of 54-88 MHz and/or 174-216 MHz. The VHF band is used for the transition broadcast channel to, for example, allow the broadcast providers to perform the hard switch in the UHF band, which allows for better signal penetration.

FIG. 1 illustrates an exemplary terrestrial broadcast system 2 for providing a plurality of first (e.g., NGBT) and second (e.g., existing or legacy broadcast) services. The terrestrial broadcast system 2 includes a legacy broadcast provider 10; partner broadcast providers 15*a*, 15*b* (also referred to as service providers); a reception apparatus 20; a server 40; and a transition broadcast provider 25. Although FIG. 1 illustrates one legacy broadcast provider 10; two partner broadcast providers 15*a*, 15*b*; one reception apparatus 20; one server 40; and one transition broadcast provider 25, it should be understood that any number of each may be included in the broadcast system 2.

The legacy broadcast provider 10 broadcasts a legacy service to the reception apparatus 20. The legacy service is broadcast according to an existing digital television standard (e.g., ATSC standard A/53, which is incorporated herein by reference in its entirety) in use before the NGBT service. The legacy broadcast provider 10 is allocated a broadcast channel (also referred to as an RF channel) on which the legacy service is broadcast. However, the legacy broadcast provider 10 is unable to broadcast any NGBT services, which are not backwards compatible with the existing service due to lack of wireless spectrum.

To allow a broadcast provider to provide legacy services and NGBT services that are not backwards compatible with the legacy services when wireless spectrum is limited, in certain embodiments, the broadcast providers enter into an agreement (e.g., a contractual agreement) to broadcast legacy services on one broadcaster's broadcast channel and to broadcast NGBT services on the other broadcaster's broadcast channel.

Partner broadcast providers 15*a*, 15*b* are examples of broadcast providers that have entered into such an agreement. As illustrated in FIG. 1, the partner broadcast provider 15*a* broadcasts a plurality of NGBT services (e.g., a plurality of first services) from a plurality of different broadcast providers 15*a*, 15*b* on a first broadcast channel. The partner broadcast partner 15*b* broadcast a plurality of legacy services (e.g., a plurality of second services) on a second broadcast channel. Each of the broadcast providers 10, 15*a*, 15*b* broadcast respective services using a broadcast tower via a studio to transmitter link (STL).

In one embodiment, the legacy and NGBT services provided by the legacy broadcast provider 10 and partner broadcast providers 15*a*, 15*b*, respectively, are television broadcast services that include one or more television content, without regard to whether the content is a movie, sporting event, segment of a multi-part series, news broadcast, etc. Further, the legacy and NGBT services may also include advertisements, infomercials, and other program-like content which may not be reported as a program in an EPG.

The plurality of NGBT services are broadcast using a first transmission scheme such as a transmission scheme based on orthogonal frequency-division multiplexing (OFDM) and the plurality of legacy services are broadcast using a second transmission scheme such as 8-VSB. However, any other combination of incompatible transmission schemes (i.e., not capable of simultaneously broadcast on the same broadcast channel) may be used to transmit the plurality of NGBT and legacy services. In one embodiment, the partner broadcast providers 15*a*, 15*b* broadcast digital television signals in accordance with standards set, for example, by the Advanced Television Systems Committee (ATSC) such as ATSC standard A/53.

Further, although the partner broadcast providers 15*a*, 15*b* and the legacy broadcast provider 10 are illustrated as each being associated with a separate broadcast tower, contractual agreements may be made between any two or more of the partner broadcast providers 15*a*, 15*b* and the legacy broadcast provider 10. For example, partner broadcast provider 15*a* may enter into a contractual agreement with partner broadcast provider 15*b* such that both partner broadcast providers 15*a*, 15*b* use the same broadcast tower to provide the plurality of NGBT and legacy services.

In one embodiment, the legacy broadcast provider 10 and partner broadcast providers 15*a*, 15*b* provide the plurality of NGBT and legacy services via terrestrial broadcasts. In the case of audio/video content, the content is compressed and broadcast using different transmission schemes, as discussed above.

For example, the audio/video content of the plurality of NGBT and legacy services is divided into a video elementary stream (ES) and an audio ES corresponding to the video and audio portions of the content. The video ES and audio ES are multiplexed with other data to form a broadcast multiplex, such as an MPEG-2 Transport Stream (TS), MPEG Media Transport (MMT) or similar technology in the case of the broadcast by the legacy broadcast provider 10 and partner broadcast provider 15*b*. Further, in one embodiment, the first broadcast channel carries a transport (e.g., an MMT) or IP packets, which is different than that broadcast by the partner broadcast provider 15*b*.

The reception apparatus 20 is configured to receive the plurality of legacy services broadcast by the legacy broadcast provider 10 and partner broadcast provider 15*b*. Alternatively, or additionally, the reception apparatus 20 is configured to receive the plurality of NGBT services broadcast by the partner broadcast provider 15*a* or new services from other sources. The plurality of legacy services is also provided to consumer devices that are not configured to receive the plurality of NGBT services (e.g., a television with a ATSC A/53 receiver).

The reception apparatus 20 is a home video processor such as a personal computer, television receiver or DVD recorder, or an information processor such as a Personal Digital Assistant (PDA), mobile phone, tablet, home or portable music player, or home or portable gaming machine. Further, the reception apparatus 20 may be a standalone device or incorporated, for example, in a television set or other consumer electronics device.

The reception apparatus 20 is configured to connect to the Internet 30 via a wireless or fixed connection. For example, when the reception apparatus 20 is a mobile device, the reception apparatus 20 connects to the Internet 30 via a mobile data connection or Wi-Fi connection. When the reception apparatus 20 is a fixed device, the reception apparatus 20 connects via an Ethernet connection, wireless connection, mobile data connection, etc.

In one embodiment, the reception apparatus 20 connects to the Internet 30 to receive or send information based on one of the plurality of NGBT services broadcast by the partner broadcast provider 15*a*. For example, the reception apparatus 20 may make a purchase for advertised goods, contents, or services via the Internet 30, request additional information related to the one of the plurality of NGBT services, interface to a social network website based on instructions accompanying the one of the plurality of NGBT services, etc. The reception apparatus 20, in one embodiment, receives the information associated with the one of the plurality of NGBT services from at least one server 40. In other embodiments, the server 40 may be provided by the partner broadcast provider 15*a* or each separate partner broadcast provider 15*a*, 15*b* may provide its own server 40.

The transition broadcast provider 25 is configured to broadcast NGBT services on a transition broadcast channel, when available. In one embodiment, the transition broadcast provider 25 assists in broadcasting NGBT services when certain broadcast providers cannot reach an agreement with each other. In another embodiment, the transition broadcast provider 25 assists in broadcasting NGBT services when entering into an agreement with another broadcaster is not feasible, such as in the case that no other broadcaster is prepared to transition to NGBT services, there are not enough broadcasters to double up services, etc.

Figure 2:
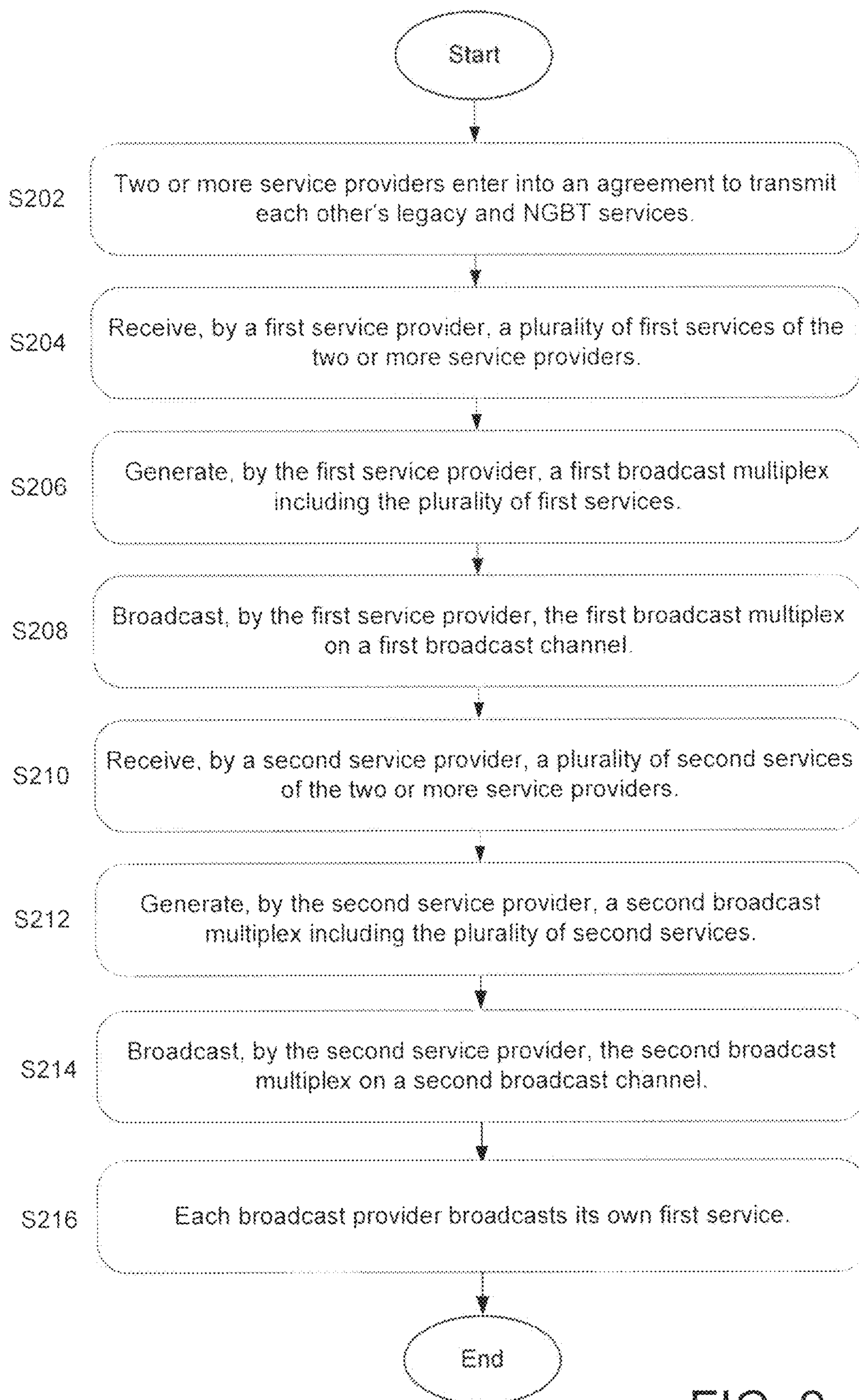
FIG. 2 illustrates an exemplary transition methodology.

FIG. 2 illustrates an exemplary transition plan for transitioning to a NGBT service that is not backwards compatible with one or more existing terrestrial broadcast services. In step S202, two or more broadcast providers enter into an agreement to broadcast each other's legacy and NGBT services. For example, the partner broadcast provider 15*a* (e.g., a first service provider) enters into an contractual agreement with the partner broadcast provider 15*b* (e.g., a second service provider) such that partner broadcast provider 15*a* broadcasts the NGBT services on a first broadcast channel assigned to the partner broadcast provider 15*a* while the partner broadcast provider 15*b* broadcasts the legacy services on a second broadcast channel assigned to the partner broadcast provider 15*b*.

In step S204, the first broadcast provider of the two or more broadcast providers, receives a plurality of first services (e.g., NGBT services) to be broadcast on the first broadcast channel. The plurality of first services includes a different first service for each of the two or more broadcast providers. For example, the partner broadcast provider 15*a* receives its own first service and a first service associated with the partner broadcast provider 15*b*. In FIG. 1, the first service from partner broadcast provider 15*b* is obtained directly from partner broadcast provider 15*b*. However, in another embodiment, the first services are provided directly to, or otherwise retrieved by, the partner broadcast provider 15*a*.

In step S206, the first broadcast provider generates a first broadcast multiplex (e.g., using a first multiplexer) that includes the plurality of first services of the two or more broadcast providers. Each of the plurality of first services is assigned a different major and minor virtual channel number combination. In one embodiment, each of the plurality of first services is assigned the same major virtual channel number. In another embodiment, at least two of the plurality of first services are assigned different major virtual channel numbers. For example, the assignment of major channel numbers corresponds to the major virtual channel number that was originally used by a respective broadcast provider to transmit services. In other embodiments, major and/or minor virtual channel numbers are assigned according to other predetermined criteria.

In step S208, the first broadcast provider transmits the first broadcast multiplex on a first broadcast channel that is allocated to the first broadcast provider. The first broadcast multiplex is transmitted according to a transmission scheme (e.g., OFDM) which is not backwards compatible with, or is otherwise different from, a transmission scheme used to transmit a second broadcast multiplex by a second broadcast provider, as described below.

In step S210, the second broadcast provider of the two or more broadcast providers, receives a plurality of second services (e.g., legacy services) to be broadcast on a second broadcast channel. The plurality of second services includes a different second service for each of the two or more broadcast providers. For example, the partner broadcast provider 15*b* receives its own second service and a second service associated with the partner broadcast provider 15*a*. In FIG. 1, the second service from partner broadcast provider 15*a* is obtained directly from partner broadcast provider 15*a*. However, in another embodiment, the first services are provided directly to, or otherwise retrieved by, the partner broadcast provider 15*b*.

In step S212, the second broadcast provider generates a second broadcast multiplex (e.g., using a second multiplexer) that includes the plurality of second services of the two or more broadcast providers. Each of the plurality of second services is assigned a different major and minor virtual channel number combination. In one embodiment, each of the plurality of first services is assigned the same major virtual channel number. In another embodiment, at least two of the plurality of first services are assigned different major virtual channel numbers. For example, the assignment of major channel numbers corresponds to the major virtual channel number that was originally used by a respective broadcast provider to transmit services. In other embodiments, major and/or minor virtual channel numbers are assigned according to other predetermined criteria.

In step S214, the second broadcast provider transmits the second broadcast multiplex on the second broadcast channel that is allocated to the second broadcast provider. The second broadcast multiplex is transmitted according to a transmission scheme (e.g., 8-VSB) which is not compatible with, or is otherwise different from, a transmission scheme used to transmit the first broadcast multiplex by the first broadcast provider.

In step S216, the transition from existing services to NGBT services is completed and transmission of the plurality of second services ends. At this time each of the two or more broadcast providers broadcasts its own NGBT service(s).

In one embodiment, the plurality of first and/or second services are applied to broadcast channels of a 6 MHz spectrum. However, any other spectrum size may be implemented, such as a spectrum that is a multiple of 6 MHz, based on spectrum availability. For example, broadcast providers with adjacent broadcast channels may agree to transmit the plurality of first or second services in a combined broadcast channel.

Further, in one embodiment, the amount of spectrum allocated to the plurality of second services is greater than the first plurality services to account for, for example, greater efficiencies in the transmission of the first plurality of services. For example, in the case of three broadcasters, two broadcast channels can be combined to broadcast legacy services while the third broadcast channel is used to broadcast NGBT services for all three broadcasters.

Figure 3A:
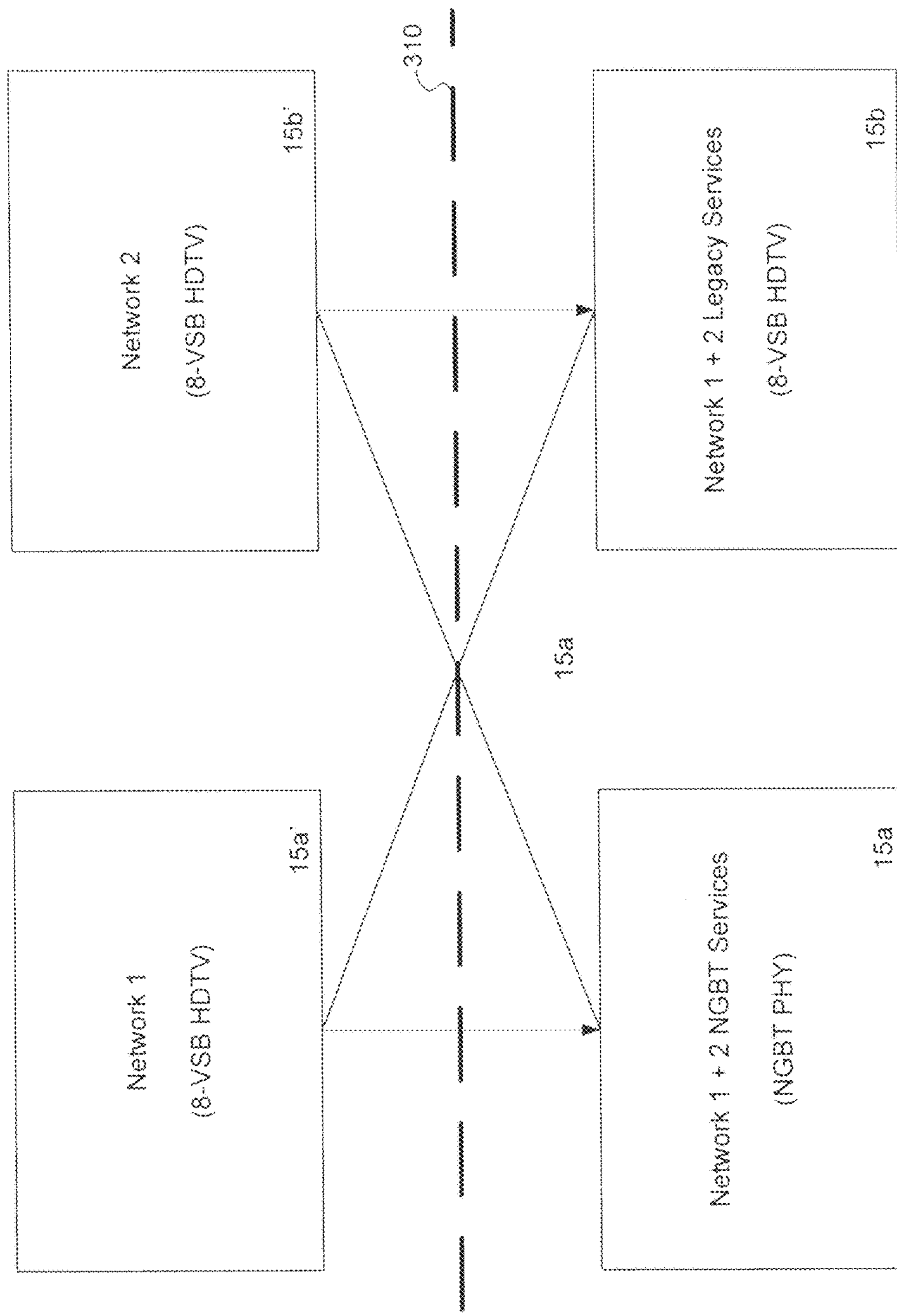
FIG. 3A illustrates an example of channel re-use.

FIG. 3A illustrates an example of channel re-use between two broadcast providers to transition to NGBT services. However, it should be noted that channel re-use can be utilized by a number of broadcast providers. Blocks 15*a*', 15*b*' represent the partner broadcast providers 15*a*, 15*b* prior to entering an agreement, which is represented by dashed line 310, to broadcast each other's services. Prior to entering the agreement, each of the broadcast providers 15*a*' and 15*b*' broadcasts its own legacy services to the reception apparatus 20. Although FIG. 3 illustrates the legacy services as high-definition television (HDTV) services broadcast via 8-VSB, any other services and/or transmission scheme may be used.

After the broadcast providers 15*a*' and 15*b*' enter into an agreement to broadcast each other's services, the partner broadcast provider 15*a* broadcasts NGBT services for both broadcast providers 15*a*', 15*b*' while the partner broadcast provider 15*b* broadcasts legacy services (also referred to as legacy services) for both broadcast providers 15*a*', 15*b*'.

In one embodiment, the legacy services use the same coding as originally used by broadcast providers 15*a*', 15*b*', such as MPEG-2. A broadcast channel can support a data rate of approximately 19.392658 Mbps However, MPEG-2 HDTV rates vary between 8-15 Mbps. Accordingly, multiple HDTV streams may not be able to fit into a single RF channel. To address this problem, in one embodiment, the partner broadcast provider 15*b*' broadcasts a different version of the legacy services originally broadcast by the broadcast providers 15*a*, 15*b*. The versions may differ by compression rate, video quality, audio quality, etc. For example, the partner broadcast provider 15*b*' broadcasts standard definition rather than high definition versions of the legacy services (i.e., SDTV versus HDTV).

In another embodiment, the legacy services use a different coding than originally used by the broadcast providers 15*a*', 15*b*', such as a more efficient coding type (e.g., MPEG-4 AVC). For example, MPEG-4 coding has half the required bit rate than MPEG-2 and MPEG-4 HDTV rates vary between 4-8 Mbps. Accordingly, even at the highest rate of 8 Mbps, 2 HDTV services can fit within the broadcast channel with room to spare.

An advantage of using MPEG-4 AVC (also referred to as H.264) is that many current televisions already have AVC decoders. H.264 is perhaps best known as being one of the codec standards for Blu-ray discs. It is also widely used by streaming Internet sources, such as videos from YouTube, and the iTunes Store. Web software such as Adobe Flash Player and Microsoft Silverlight and various HDTV broadcasts over terrestrial (ATSC, Integrated Services Digital Broadcasting-Terrestrial (ISDB-T), Digital Video Broadcasting-Terrestrial (DVB-T), or Digital Video Broadcasting—Second Generation Terrestrial (DVB-T2), cable (DVB-C) and satellite (DVB-S and DVB-S2) also use H.264 AVC coding. So, worldwide TVs require this codec. According, MPEG-4 is expected to be supported by almost all TV's by the time existing HDTV services transition to NGBT services.

Further, broadcast transmitters also require the H.264 codec as it is currently used in Mobile DTV (A/153) and other standards. Hooking up this codec is relatively easy as the transmitter encoder has both MPEG-2 and MPEG-4 coders in the same piece of equipment. Accordingly, because the AVC codec are currently in use, this codec can be easily utilized for the transition.

Although many television sets are equipped with MPEG-4 decoders, some television sets are configured such that the MPEG-4 decoders are used to decode non-terrestrial broadcast services. Accordingly, these television sets may need to be reprogrammed to utilize the MPEG-4 decoder for the terrestrial broadcast services. Alternatively, set top boxes may be connected to the television sets to receive legacy services. Depending on the feasibility of reconfiguring television sets to utilize MPEG-4, MPEG-2 may be utilized to ensure compatibility.

Figures 3B, 3C, 3D:
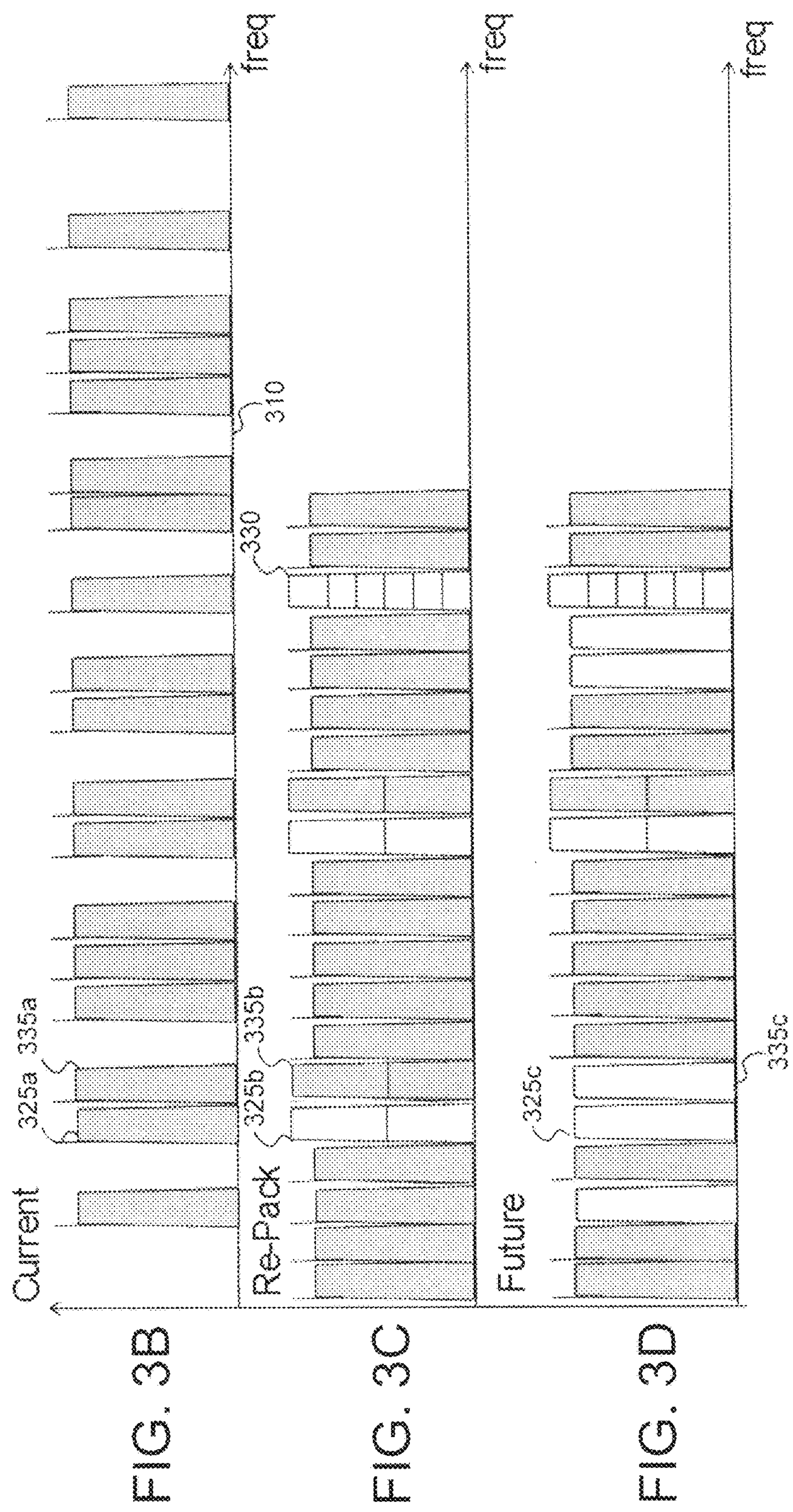
FIGS. 3B-3D illustrate examples of broadcast spectrum usage.
Figure 4:
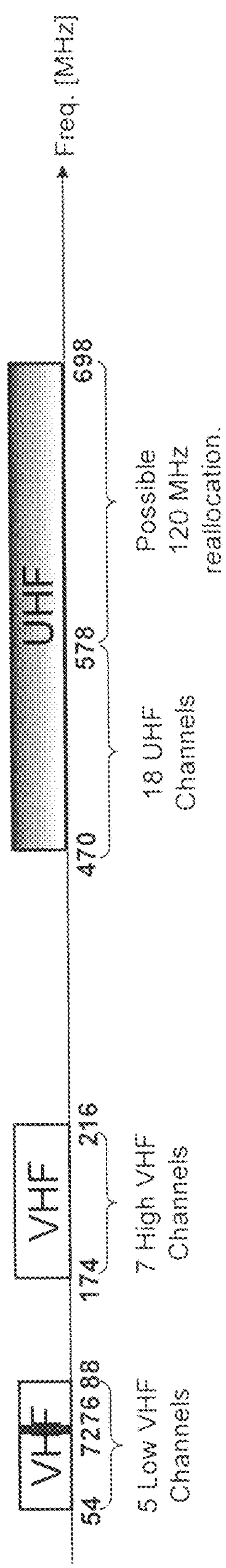
FIG. 4 illustrates an example of the broadcast spectrum.

FIGS. 3B-3D illustrate an example of broadcast spectrum usage when transitioning to NGBT services. In one embodiment, the broadcast channels are consistent with the television broadcast channel allocation illustrated in FIG. 4. The broadcast channels may or may not occupy a portion of the broadcast spectrum between 578 MHz and 698 MHz based on whether the FCC reallocates that frequency band for other uses such as wireless broadband.

FIG. 3B illustrates an example of broadcast spectrum usage for existing digital television broadcast services according to ATSC A/53. The broadcast spectrum includes unused broadcast channels 310 and occupied broadcast channels such as broadcast channels 325*a*, 335*a*. The FCC is expected to reallocate portions of the existing broadcast spectrum available for existing television broadcast services for other purposes, such as broadband services. After this allocation (or repack), in a worst case scenario, no unused broadcast channels would be available in crowded markets.

By re-using broadcast channels to broadcast legacy and NGBT services, a transition from the legacy to the NGBT services can still be made even when unused broadcast channels are not available. When unused broadcast channels are available, at least one broadcast channel is optionally allocated as a transition broadcast channel 330, as illustrated in FIG. 3C. The at least one transition broadcast channel 330 may be assigned by a government entity such as the FCC or determined by the individual television broadcasters. An exemplary transition channel is disclosed in U.S. provisional application No. 61/733,242, which is incorporated herein by reference in its entirety.

The at least one transition broadcast channel 330 may or may not have enough capacity to concurrently carry a NGBT service from each of the broadcast providers in the same market. In one embodiment, each of the at least one broadcast channel 330 has sufficient capacity to carry six different NGBT services. Depending on the embodiment, each of the six different first services are provided by a different broadcast provider or the same broadcast provider may provide two or more of the six different services. However, other numbers of services may be provided on the transition broadcast channel 330 based on bit rate requirements.

The at least one transition broadcast channel 330 allows broadcast providers (e.g., broadcast providers 15*a*', 15*b*') to provide legacy and NGBT services, concurrently, until the broadcast providers switch their own broadcasts to the NGBT services. In one embodiment, the broadcast providers include the same content in both the legacy and NGBT services. In a further embodiment, the broadcast providers include higher resolution, or otherwise enhanced, content in the NGBT services.

FIG. 3C illustrates a broadcast channel 325*b* used to broadcast NGBT services from two or more different broadcast providers, and a broadcast channel 335*b* used to broadcast legacy services from the two or more different broadcast providers (e.g., originally broadcast on broadcast channels 325*a*, 335*a*).

FIG. 3D illustrates an example where some of the broadcast providers have switched their own broadcast channels to broadcasting the NGBT services. For example, the broadcast channels 325*b*, 335*b* now broadcast NGBT services of their respective broadcast providers as illustrated by broadcast channels 325*c*, 335*c*. Further, as other broadcast providers transition to broadcasting the NGBT services, transition broadcast channel space is freed up for use by other broadcast providers.

If necessary, transition broadcast channel access by each broadcast provider may be prioritized based on a lottery, auction, business agreement between the various broadcast providers, etc. For example, transition broadcast channel space may be allocated to broadcast providers that are unable to form an agreement with another broadcast provider to broadcast each other's services.

Figure 5:
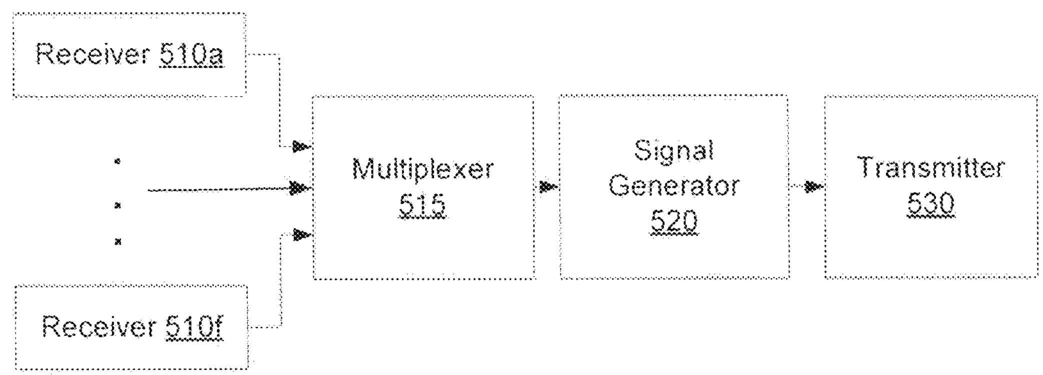
FIG. 5 illustrates an example of a distribution system.

FIG. 5 illustrates an example of a distribution system 500 used by the partner broadcast provider 15*a* to broadcast the plurality of NGBT services in one embodiment. The distribution system 500 includes at least one receiver (e.g., receivers 510*a*-510*f*, one for each NGBT service) to receive the plurality of NGBT services to be provided by the distribution system 500. In other embodiments, one of the receivers 510*a*-510*f* may be configured to receive two or more of the NGBT services from one or more of the broadcast providers.

The receivers 510*a*-510*f* receive the plurality of NGBT services from at least two broadcast providers. In another embodiment, the receivers 510*a*-510*f* receive the plurality of NGBT services from at least one broadcast provider. The receivers 510*a*-510*f* provide the received plurality of NGBT services to a multiplexer 515 that generates a broadcast multiplex including the plurality of NGBT services and forwards the broadcast multiplex to a signal generator 520. The signal generator 520 generates a broadcast signal with the plurality of NGBT services and provides the broadcast signal to a transmitter 530 for broadcast to the reception apparatus 20.

Figure 6:
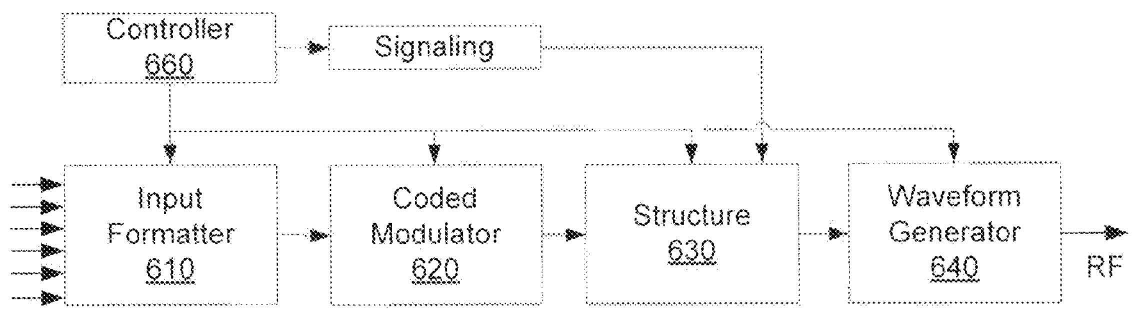
FIG. 6 illustrates an example of a signal generator.

In one embodiment, the signal generator 520 is an OFDM-based signal generator as illustrated in FIG. 6. As illustrated in FIG. 6, an input formatter 610 receives the plurality of NGBT services from the receivers 510*a*-510*f* and multiplexer 515. The input formatter 610 formats the IP packets and/or transport streams associated with the plurality of received NGBT services into packets of the same length for forward error correction (FEC). A coded modulator 620 modulates the signal and a structure 630 performs framing output and signaling. A waveform generator 640 subsequently performs an inverse Fast Fourier transform (FFT) to generate the OFDM-based signal.

In one embodiment, a controller 660 controls the operation of each of the input formatter 610, coded modulator 620, structure 630, and waveform generator 640. Further, the controller 660 provides signaling information to the structure 630. The signaling information includes, for example, FFT size (e.g., 1024, 4096, 8192, 32768, etc.), frame structure (i.e., how much data is in the frame), FEC structure (e.g., LDPC coding structure), modulation setting (e.g., 1024QAM, 256QAM), etc. The controller 660 may be a dedicated controller for the signal generator 520 or implemented by a controller of the reception apparatus 20.

The partner broadcast provider 15*b* and/or transition broadcast provider 25 may utilize a distribution system that is similar to the distribution system 500 described above. However, the signal generator 520 and/or transmitter 530 are appropriately modified in accordance with the transmission scheme used to broadcast the plurality of legacy services in the case of the partner broadcast provider 15*b*. For example, the signal generator 520 is configured to generate an 8-VSB modulation signal. Further, the signal generator 520 may be configured to compress, or otherwise reduce the bit rate of, the received plurality of legacy services when needed to fit the plurality of NGBT services into the broadcast channel.

With regard to the transition broadcast provider 25, in one embodiment at least one receiver in the distribution system of the transition broadcast provider 25 receives a plurality of NGBT services from one or more different broadcast providers. The plurality of NGBT services are provided to the transition broadcast provider 25 via any one or a combination of communication means such as microwave transmissions (e.g., satellite or terrestrial), the Internet, a dedicated wired connection, cable television, shipping storage media containing the first service, etc. Similar communication means may also be utilized by the partner broadcast providers 15*a*, 15*b*. A broadcast signal including the plurality of NGBT services is generated by a signal generator in the distribution system and a transmitter broadcasts the plurality of NGBT services over a transition broadcast channel.

Figure 7:
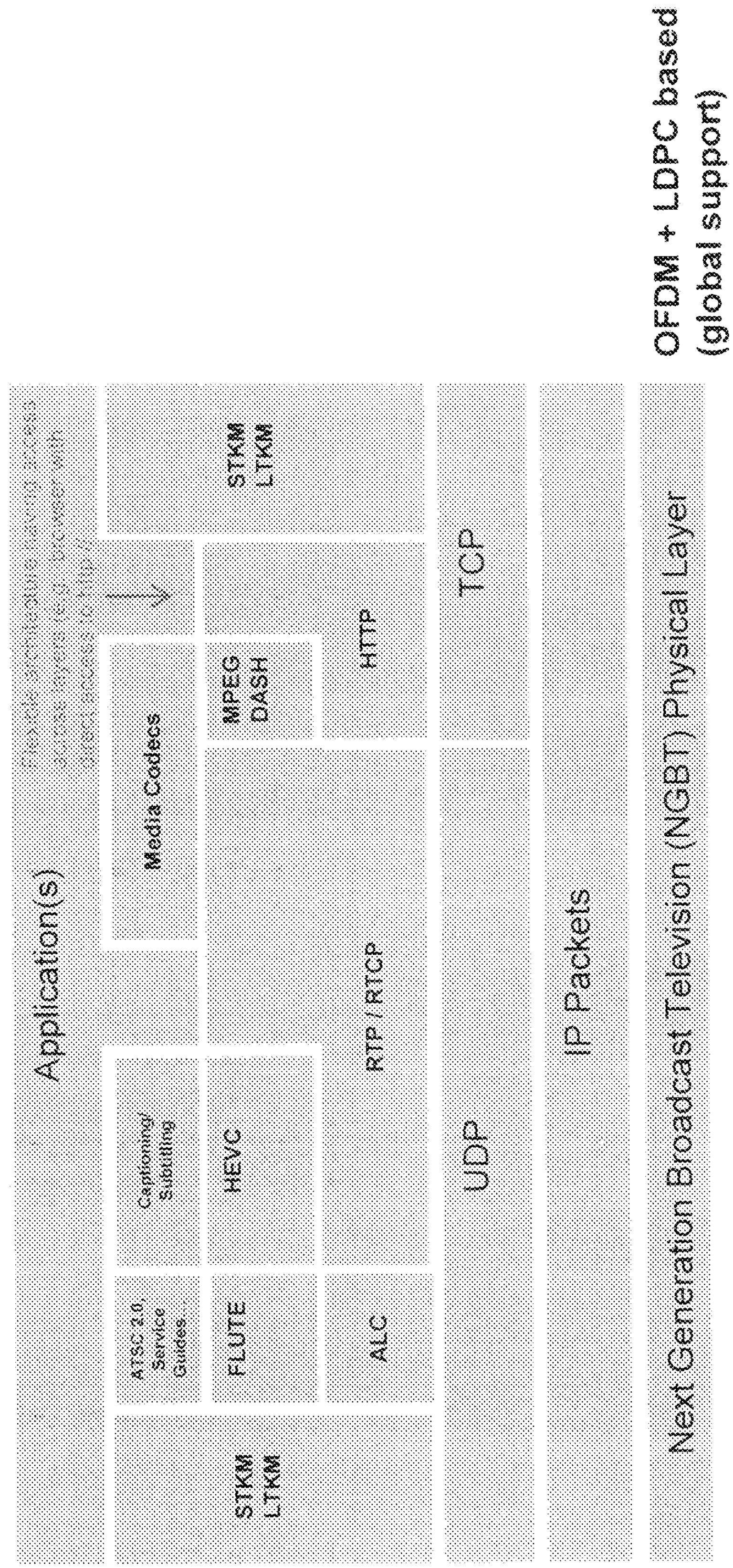
FIG. 7 illustrates an exemplary protocol stack.

FIG. 7 illustrates an exemplary protocol stack for a NGBT service. In one embodiment, the physical layer is implemented using OFDM and LDPC code. However, other encoding and/or error correction modes may be utilized. Applications of the protocol stack include a video presentation, a social media interface, interactivity, ATSC 2.0, etc. For example, in one embodiment, the protocol stack provides a social media interface to share content on Facebook that is being watched on the reception apparatus 20. Broadcast content is sent via the user datagram protocol (UDP), which sends data one-way (no hand-shaking), and the social media interface is provided through the transmission control protocol (TCP) for hand-shaking acknowledgement of sent data, for example using Moving Picture Experts Group (MPEG) Dynamic Adaptive Streaming over Hypertext Transfer Protocol (DASH). MPEG DASH allows for dynamic control of service (video and audio) bit rate, which allows a smooth video to be maintained when networks are congested.

As illustrated in FIG. 7, the protocol stack includes a file delivery unidirectional transport (FLUTE) as defined in RFC 392 for delivering files in a transport, which is incorporated herein by reference in its entirety. The protocol stack further includes short-term key messages (STKMs) and long-term key messages (LTKMs) used as keys for encrypted content, the real-time transport protocol (RTP) which provides real-time transport of data, the real-time transport control protocol (RTCP) which provides out-of-band statistics and control information for an RTP flow, asynchronous layered coding (ALC) which allows fro asynchronous stuffing of data into a datagram (e.g., UDP), high efficiency video coding (HEVC) for video and/or audio coding. The hypertext transfer protocol (HTTP) is used mainly in Internet access; the ATSC 2.0/Service Guides are table listings of content; captioning/subtitling are text fragments describing video content; and media codecs are HEVC, object-oriented audio coding, etc. to be used in either broadcast or broadband connections. Application is the presentation of data to the display device.

Figure 8:
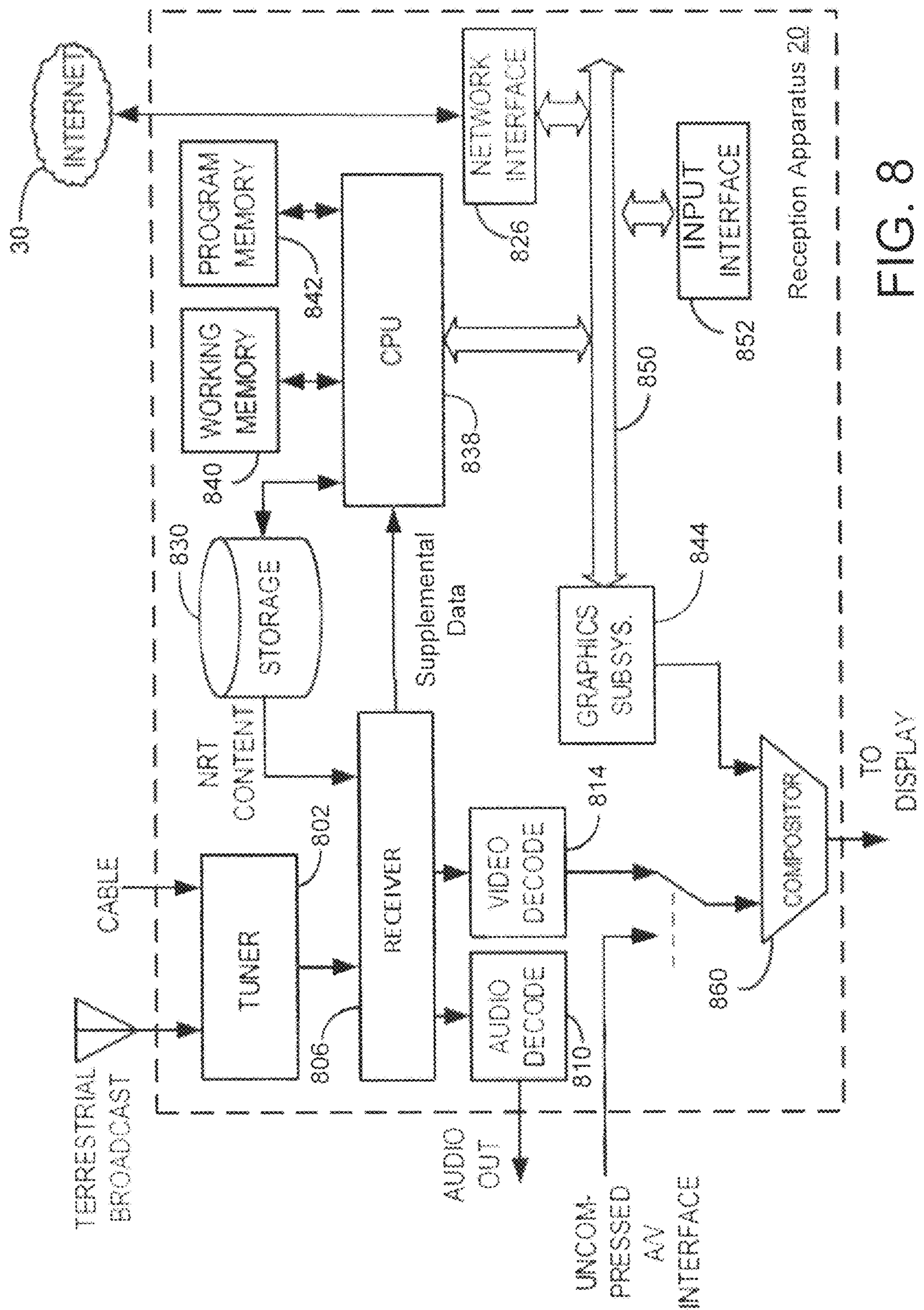
FIG. 8 is a block diagram of an exemplary reception apparatus.

FIG. 8 illustrates an embodiment of the reception apparatus 20. The reception apparatus 20 is, or is integrated or an add-on component to, a mobile device such as a cellular phone, tablet, smart phone, portable computer, etc. In other embodiments, the reception apparatus 20 is a fixed device such as a digital television receiver device that is incorporated into a television set, a set top box, or any other fixed device configured to receive television content.

The reception apparatus 20 includes a tuner 802, which is configured to tune to different broadcast channels and receive one or a combination of the plurality of NGBT services broadcast by the partner broadcast provider 15*a* and the plurality of legacy services broadcast by the partner broadcast provider 15*b* and legacy broadcast provider 10 via a terrestrial broadcast.

It should be noted that in certain embodiments, the transmission of legacy services by the partner broadcast provider 15*b* and the legacy broadcast provider 10 is the same except that legacy services from different broadcast providers are transmitted by the partner broadcast provider 15*b*. For example, the legacy services utilize one or a combination of the same coding, bit rate, etc.

In one embodiment, the tuner 802 provides a broadcast signal received over a currently tuned broadcast channel to a receiver 806. The receiver 806 extracts audio and video (A/V) streams from a selected one of the plurality of NGBT or legacy services. In one embodiment, the receiver 806 is one or a combination of an 8-VSB and OFDM-based receiver. However, the receiver 806 may be configured to process other signal types such as an NGBT signal or other broadcast signal of a type different from the signal broadcast by the broadcast providers 15*a*, 15*b*. The audio is decoded by an audio decoder 810 and the video is decoded by a video decoder 814. Further, uncompressed A/V data may be received via an uncompressed A/V interface (e.g., a HDMI interface). In one embodiment, the uncompressed A/V interface is only provided when the reception apparatus 20 is a fixed device.

The broadcast signal includes supplemental data such as one or a combination of closed caption data, EPG data, interactive content, ATSC 2.0 content, software applications, a social media interface, emergency services, accessibility data, etc. The supplemental data are separated out by the receiver 806. However, the supplemental data may be received via the Internet 30 and a network interface 226. The network interface 226 includes one or a combination of wired and wireless interfaces (e.g., a Ethernet interface, cellular data network interface, etc.) A storage memory 830 is provided to store non-real time or Internet-delivered content such as the supplemental data.

The reception apparatus 20 generally operates under control of at least one processor, such as CPU 838, which is coupled to a working memory 840, program memory 842, and a graphics subsystem 844 via one or more buses (e.g., bus 850). The CPU 838 receives closed caption data from the receiver 806 as well as any other supplemental data used for rendering graphics, and passes appropriate instructions and data to the graphics subsystem 844. The graphics outputted by the graphics subsystem 844 are combined with video images by the compositor and video interface 860 to produce an output suitable for display on a video display.

Further, the CPU 838 operates to carry out functions of the reception apparatus 20 including the processing of the supplemental data (e.g., interactivity, social media interfacing, etc.) and based on user inputs received from an input interface 852.

Although not illustrated in FIG. 8, the CPU 838 may be coupled to any one or a combination of the reception apparatus 20 resources to centralize control of one or more functions. In one embodiment, the CPU 838 also operates to oversee control of the reception apparatus 20 including the tuner 802 and other television resources.

Figure 9:
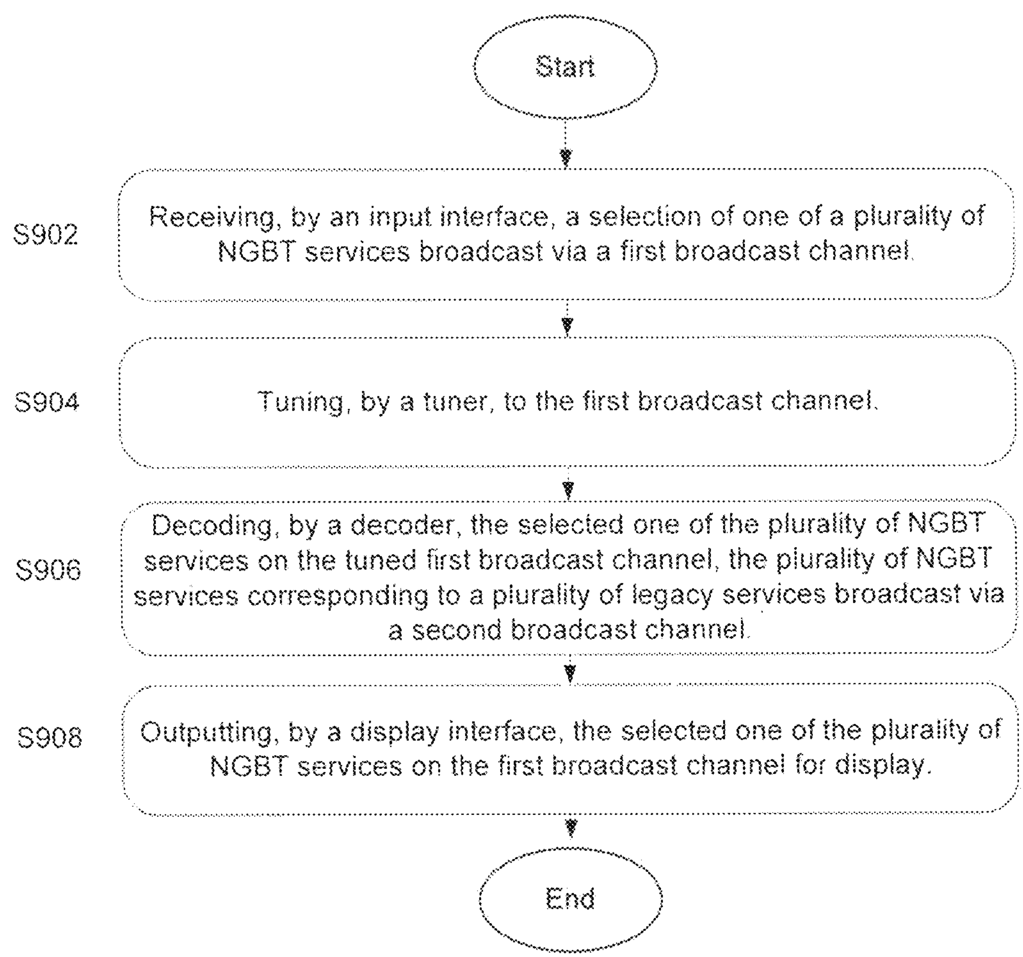
FIG. 9 illustrates a flow diagram of an exemplary reception method.

FIG. 9 is a flow diagram of an exemplary reception method. In step S902, the reception apparatus 20 receives, via an input interface (e.g., a touch screen, remote control receiver, etc.) a selection of one of a plurality of NGBT services broadcast via a first broadcast channel. In step S904, the reception apparatus 20 tunes to the first broadcast channel.

In step S906, the reception apparatus 20 decodes the selected one of the plurality of NGBT services on the tuned first broadcast channel. The plurality of NGBT services correspond to a plurality of legacy services broadcast via a second broadcast channel. In certain embodiments, the plurality of NGBT services correspond to the plurality of legacy services in that both contain different versions of the same content. For example, the plurality of first services include UHDTV versions, and the plurality of second services include HDTV versions, of the same television program In step S908, the reception apparatus 20 outputs the selected one of the plurality of NGBT services on the first broadcast channel for display.

Figure 10:
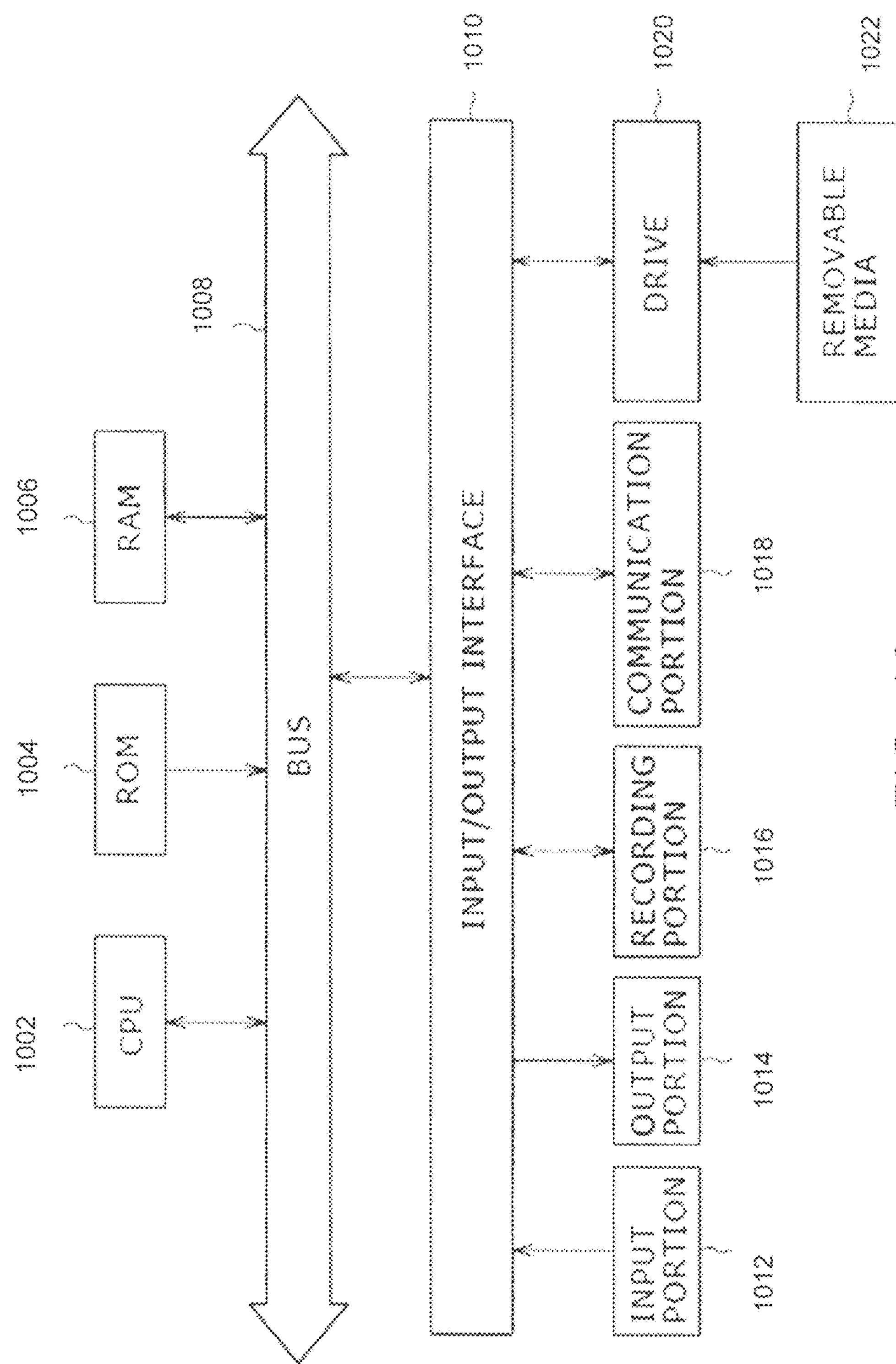
FIG. 10 is an exemplary computer.

FIG. 10 is a block diagram showing an example of a hardware configuration of a computer 1000 that can be configured to function as, control, or incorporate, any one or a combination of a distribution system for the partner broadcast providers 15*a*, 15*b*; reception apparatus 20; server 40; and transition broadcast server 25.

As illustrated in FIG. 10, the computer 1000 includes a central processing unit (CPU) 1002, read only memory (ROM) 1004, and a random access memory (RAM) 1006 interconnected to each other via one or more buses 1008. The one or more buses 1008 are further connected with an input-output interface 1010. The input-output interface 1010 is connected with an input portion 1010 formed by a keyboard, a mouse, a microphone, remote controller, etc. The input-output interface 1010 is also connected to an output portion 1014 formed by an audio interface, video interface, display, speaker, etc.; a recording portion 1016 formed by a hard disk, a non-volatile memory, etc.; a communication portion 1018 formed by a network interface, modem, USB interface, fire wire interface, etc.; and a drive 1020 for driving removable media 1022 such as a magnetic disk, an optical disk, a magneto-optical disk, a semiconductor memory, etc.

According to one embodiment, the CPU 1002 loads a program stored in the recording portion 1016 into the RAM 1006 via the input-output interface 1010 and the bus 1008, and then executes a program configured to provide the functionality of the one or combination of the distribution system for the partner broadcast providers 15*a*, 15*b*; reception apparatus 20; server 40; and transition broadcast server 25.

Although embodiments of the present disclosure are discussed with respect to transitioning services for terrestrial broadcast channels, more particularly television broadcast channels, the transition plans described above apply equally to radio station broadcasts (e.g., when transitioning to a new services that includes picture content), satellite broadcasts, and any other communication method in which transmission capacity is limited.

The various processes discussed above need not be processed chronologically and/or in the sequence depicted as flowcharts; the steps may also include those processed in parallel or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a system, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present disclosure are possible in light of the above teachings. It is therefore to be understood that within the scope of the appended claims, the present disclosure may be practiced otherwise than as specifically described herein.

The above disclosure also encompasses the embodiments noted below.

(1) A method for broadcasting a plurality of non-backwards-compatible services, the method comprising receiving, by a first service provider, a plurality of first services, including a first service associated with the first service provider and a first service associated with a second service provider; generating a first broadcast multiplex including the plurality of first services, broadcasting, by the first service provider, the first broadcast multiplex on a first broadcast channel allocated to the first service provider; receiving, by the second service provider, a plurality of second services, including a second service associated with the first service provider and a second service associated with the second service provider; generating a second broadcast multiplex including the plurality of second services; and broadcasting, by the second service provider, the second broadcast multiplex on a second broadcast channel allocated to the second service provider.

(2) The method according to feature (1), in which the plurality of second services has a lower video resolution than the plurality of first services.

(3) The method according to feature (1) or (2), in which the plurality of first services are encoded using a first coding and the plurality of second services are encoded using a second coding, the first coding being different from the second coding.

(4) The method according to feature (3), in which the first coding is MPEG-2 or MPEG-4.

(5) The method according to any of features (1) to (4), in which the plurality of first and second services include television programs, and the step of broadcasting the first broadcast multiplex includes broadcasting at least one television program that is the same as a television program broadcast in the step of broadcasting the second broadcast multiplex.

(6) The method according to any of features (1) to (5), in which at least two of the plurality of second services are broadcast on the same physical broadcast channel and assigned different major virtual channel numbers.

(7) The method according to any of features (1) to (6), in which the first and second service providers are digital television broadcast providers, the second service provider broadcasts digital television content over the second broadcast channel using an 8-level vestigial sideband modulation (8-VSB) modulation method, and the first service provider broadcasts digital television content using a modulation method different from the 8-VSB modulation method.

(8) The method according to any of features (1) to (7), further comprising entering into a contract between the first and second service providers to provide the plurality of first services on the first broadcast channel and the plurality of seconds services on the second broadcast channel.

(9) A distribution system, comprising a first service provider, including a first receiver configured to receive a plurality of first services, including a first service associated with the first service provider and a first service associated with a second service provider, a first multiplexer configured to generate a first broadcast multiplex including the plurality of first services, and a transmitter configured to broadcast the first broadcast multiplex on a first broadcast channel allocated to the first service provider; and the second service provider, including a second receiver configured to receive a plurality of second services, including a second service associated with the first service provider and a second service associated with the second service provider; a second multiplexer configured to generate a second broadcast multiplex including the plurality of second services, and a second transmitter configured to broadcast the second broadcast multiplex on a second broadcast channel allocated to the second service provider.

(10) The distribution system according to feature (9), in which the plurality of second services have a lower video resolution than the plurality of first services.

(11) The distribution system according to feature (9) or (10), in which the plurality of first services are encoded using a first coding and the plurality of second services are encoded using a second coding, the first coding being different from the second coding.

(12) The distribution system according to feature (11), in which the first coding is MPEG-2 or MPEG-4.

(13) The distribution system according to any of features (9) to (12), in which the plurality of first and second services include television programs, and the first transmitter broadcasts at least one television program that is the same as a television program broadcast by the second transmitter.

(14) The distribution system according to any of features (9) to (13), in which at least two of the plurality of second services are broadcast on the same physical broadcast channel and assigned different major virtual channel numbers.

(15) The distribution system according to any of features (9) to (14), in which the first and second service providers are digital television broadcast providers, the second service provider broadcasts digital television content over the second broadcast channel using an 8-level vestigial sideband modulation (8-VSB) modulation method, and the first service provider broadcasts digital television content using a modulation method different from the 8-VSB modulation method.

(16) The distribution system according to any of features (9) to (15), in which the first and second service providers have a contract to provide the plurality of first services on the first broadcast channel and the plurality of second services on the second broadcast channel.

(17) A reception apparatus configured to receive a plurality of first services from a plurality of different broadcast providers on a first broadcast channel, the reception apparatus comprising circuitry configured to receive a selection of one of the plurality of first services broadcast via the first broadcast channel, to tune to the first broadcast channel, to decode the selected one of the plurality of first services on the tuned first broadcast channel, the plurality of first services corresponding to a plurality of second services from the plurality of different broadcast providers broadcast on a second broadcast channel, and to output the selected one of the plurality of first services on the transition broadcast channel for display.

(18) The reception apparatus according to feature (17), in which at least two of the plurality of services are associated with different major virtual channel numbers.

The invention claimed is:

1. A method for broadcasting a non-backwards-compatible service, the method comprising:

causing, by first circuitry of a service provider, first content data of the non-backwards-compatible service to be transmitted over a single wireless transition broadcast channel in a first broadcast signal, the first broadcast signal transmitted over the single wireless transition broadcast channel including non-backward compatible services of a plurality of different service providers, the single wireless transition broadcast channel being allocated as a transition channel to be shared by the plurality of different service providers;

generating, by the first circuitry, a second broadcast signal including second content data of a service to be replaced by the non-backwards-compatible service; and transmitting, by the first circuitry, the second broadcast signal on a single wireless broadcast channel allocated to the service provider when the first broadcast signal is transmitted on the single wireless transition broadcast channel, wherein the single wireless transition broadcast channel is different from the single wireless broadcast channel, wherein the non-backwards-compatible service is a digital television service, and wherein the single wireless transition broadcast channel is adjacent to a wireless channel that is allocated for transmission of another type of service.

2. The method according to claim 1, further comprising:

receiving, by second circuitry of a transition broadcast provider, the first content data of the non-backwards-compatible service from the service provider and third content data of a non-backwards-compatible service from another service provider;

generating, by the second circuitry, the first broadcast signal that includes the first and third content data of the non-backwards-compatible services from the service provider and the other service provider; and transmitting, by the second circuitry, the first broadcast signal on the single wireless transition broadcast channel.

3. The method according to claim 1, wherein the single wireless transition broadcast channel is a terrestrial broadcast channel designated by the Federal Communications Commission (FCC).

4. The method according to claim 3, wherein the single wireless transition broadcast channel is designated from a repack of television broadcast channels.

5. The method according to claim 1, wherein the other type of service is a Mobile Network Operator Service.

6. The method according to claim 1, wherein the wireless channel is channel 32 or 52.

7. The method according to claim 1, wherein, the service has a lower video resolution than the non-backwards-compatible service.

8. The method according to claim 1, wherein the service is encoded using a first coding and the non-backwards-compatible service is encoded using a second coding, the first coding being different from the second coding.

9. The method according to claim 1, wherein the service and the non-backwards-compatible service include television programs, and the step of transmitting includes transmitting at least one television program that is the same as a television program being broadcast by a transition broadcast provider.

10. A distribution system, comprising:

a service provider, including first circuitry configured to cause first content data of a non-backwards-compatible service to be transmitted over a single wireless transition broadcast channel in a first broadcast signal, the first broadcast signal transmitted over the single wireless transition broadcast channel including non-backward compatible services of a plurality of different service providers, the single wireless transition broadcast channel being allocated as a transition channel to be shared by the plurality of different service providers;

generate a second broadcast signal including second content data of a service to be replaced by the non-backwards-compatible service; and transmit the second broadcast signal on a single wireless broadcast channel allocated to the service provider when the first broadcast signal is transmitted on the single wireless transition broadcast channel, wherein the single wireless transition broadcast channel is different from the single wireless broadcast channel, wherein the non-backwards-compatible service is a digital television service, and wherein the single wireless transition broadcast channel is adjacent to a wireless channel that is allocated for transmission of another type of service.

11. The distribution system according to claim 10, further comprising:

a transition broadcast provider, including second circuitry configured to receive the first content data of the non-backwards-compatible service from the service provider and third content data of a non-backwards-compatible service from another service provider;

generate the first broadcast signal that includes the first and third content data of the non-backwards-compatible services from the service provider and the other service provider; and transmit the first broadcast signal on the single wireless transition broadcast channel.

12. The distribution system according to claim 10, wherein the single wireless transition broadcast channel is a terrestrial broadcast channel designated by the Federal Communications Commission (FCC).

13. The distribution system according to claim 12, wherein the single wireless transition broadcast channel is designated from a repack of television broadcast channels.

14. The distribution system according to claim 10, wherein the other type of service is a Mobile Network Operator Service.

15. The distribution system according to claim 10, wherein the wireless channel is channel 32 or 52.

16. The distribution system according to claim 10, wherein the service has a lower video resolution than the non-backwards-compatible service.

17. The method according to claim 10, wherein the service is encoded using a first coding and the non-backwards-compatible service is encoded using a second coding, the first coding being different from the second coding.

18. The distribution system according to claim 10, wherein the service and the non-backwards-compatible service include television programs, and the first circuitry is configured to transmit at least one television program that is the same as a television program being broadcast by a transition broadcast provider.

* * * * *